United States Patent
Liu et al.

(10) Patent No.: US 10,755,400 B2
(45) Date of Patent: Aug. 25, 2020

(54) METHOD AND COMPUTING DEVICE FOR MONITORING OBJECT

(71) Applicant: Wistron Corporation, New Taipei (TW)

(72) Inventors: Zhen-Te Liu, New Taipei (TW); Ching-An Cho, New Taipei (TW)

(73) Assignee: Wistron Corporation, New Taipei (TW)

(*) Notice: Subject to any disclaimer, the term of this patent is extended or adjusted under 35 U.S.C. 154(b) by 106 days.

(21) Appl. No.: 16/027,281

(22) Filed: Jul. 4, 2018

(65) Prior Publication Data
US 2019/0304080 A1 Oct. 3, 2019

(30) Foreign Application Priority Data
Apr. 2, 2018 (TW) .............................. 107111603 A

(51) Int. Cl.
| | |
|---|---|
| G06T 7/00 | (2017.01) |
| G06T 7/13 | (2017.01) |
| G06T 7/254 | (2017.01) |
| G06T 7/70 | (2017.01) |
| G06T 5/30 | (2006.01) |
| G06T 7/11 | (2017.01) |

(52) U.S. Cl.
CPC .............. *G06T 7/0002* (2013.01); *G06T 5/30* (2013.01); *G06T 7/11* (2017.01); *G06T 7/13* (2017.01); *G06T 7/254* (2017.01); *G06T 7/70* (2017.01); *G06T 2207/20224* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0057701 A1* | 3/2013 | Ushijima | ............... | G03B 13/36 348/169 |
| 2018/0189946 A1* | 7/2018 | Kusens | ............... | G08B 21/043 |

FOREIGN PATENT DOCUMENTS

| | | |
|---|---|---|
| CN | 104021570 | 9/2014 |
| CN | 105046719 | 11/2015 |

OTHER PUBLICATIONS

"Office Action of Taiwan Counterpart Application", dated Dec. 22, 2018, p. 1-p. 14.

* cited by examiner

*Primary Examiner* — Ruiping Li
(74) *Attorney, Agent, or Firm* — JCIPRNET

(57) ABSTRACT

A method and a computing device for monitoring an object are provided, where the method includes the following steps. An image sequence captured on a monitored area is received. Whether a target object is within a region of interest (ROI) of the monitored area is determined. If the determination is not affirmative and at least one first moving object is detected, whether the first moving object enters the ROI is determined according to a relative position between the first moving object and a detection boundary as well as whether the first moving object has continuous movements in the ROI. If the determination is affirmative, whether the target object leaves the ROI is determined according to a relative position between at least one second moving object associated with the target object and the detection boundary as well as whether the second moving object has continuous movements in a non-ROI.

30 Claims, 10 Drawing Sheets

METHOD AND COMPUTING DEVICE FOR MONITORING OBJECT

CROSS-REFERENCE TO RELATED APPLICATION

This application claims the priority benefit of Taiwan application serial no. 107111603, filed on Apr. 2, 2018. The entirety of the above-mentioned patent application is hereby incorporated by reference herein and made a part of this specification.

TECHNICAL FIELD

The disclosure relates to a technique for monitoring an object, and more particularly, to a method and a computing device related to monitoring whether a target object enters or leaves a region of interest (ROI).

BACKGROUND

With the evolution of cloud computing, Internet of Things (IoT), and big data in recent years, many manufacturers in the medical industry are committed to promoting various sensing devices to assist medical personnel for remotely monitoring patients and thereby saving human resources in nursing.

Currently, the most common sensing device applied in home care is a bracelet, which determines whether a patient stays in bed based on detected data. However, such determination may be inaccurate if the patient drops or loses the bracelet. In addition, mattresses installed with pressure sensors are also available on the market so whether the user is on the bed or getting off the bed can be determined according to pressure changes. However, pressure is considered as indirect information and is not able to completely represent the user's motion. Such determination may also be inaccurate and thereby creating more troubles to nursing personnel.

SUMMARY OF THE DISCLOSURE

Accordingly, the disclosure provides a method and a computing device for monitoring an object to effectively monitor whether a target object (e.g., a human being) enters or leaves the ROI (e.g., a bed) by image detection and thereby reduce the cost of manual monitoring.

In an embodiment of the disclosure, the method is applicable to a computing device and includes the following steps. An image sequence associated with a monitored area is received. A ROI and a non-ROI are defined in the monitored area, and there exists a detection boundary between the ROI and the non-ROI. Whether a target object is within the ROI is determined according to the image sequence. When the target object is determined to be not within the ROI and at least one first moving object is detected in the monitored area, whether the at least one first moving object enters the ROI is determined and the at least one first moving object is thereby set as the target object according to a relative position between the at least one first moving object and the detection boundary as well as whether there exist continuous movements of the at least one first moving object in the ROI. When the target object is determined to be within the ROI, whether the target object leaves the ROI is determined according to a relative position between at least one second moving object associated with the target object and the detection boundary and whether there exist continuous movements of the at least one second moving object in the non-ROI.

In an embodiment of the disclosure, the computing device includes a memory and a processor, where the processor is coupled to the memory. The memory is configured to store images and data. The processor is configured to execute steps of: receiving an image sequence associated with a monitored area, where a ROI and a non-ROI are defined in the monitored area, and there exists a detection boundary between the ROI and the non-ROI; determining whether a target object is within the ROI according to the image sequence; when determining that the target object is not within the ROI and detecting that at least one first moving object is in the monitored area, determining whether the at least one first moving object enters the ROI and thereby setting the at least one first moving object as the target object according to a relative position between the at least one first moving object and the detection boundary as well as whether there exist continuous movements of the at least one first moving object in the ROI; and when determining that the target object is within the ROI, determining whether the target object leaves the ROI according to a relative position between at least one second moving object associated with the target object and the detection boundary and whether there exist continuous movements of the at least one second moving object in the non-ROI.

In an embodiment of the disclosure, said method is applicable to the computing device and includes the following steps. An image sequence associated with a monitored area is received. A ROI and a non-ROI are defined in the monitored area, and there exists a detection boundary between the ROI and the non-ROI. Whether a target object is within the ROI is determined according to the image sequence. When the target object is determined to be not within the ROI and at least one first moving object is detected to be in the monitored area, whether the at least one first moving object enters the ROI is determined and the at least one first moving object is thereby set as the target object according to a proportion of the at least one first moving object within the ROI and whether there exist continuous movements of the at least one first moving object in the ROI. When the target object is determined to be within the ROI, whether the target object leaves the ROI is determined according to a proportion of at least one second moving object associated with the target object within the non-ROI and whether there exist continuous movements of the at least one second moving object in the non-ROI.

In an embodiment of the disclosure, the computing device includes a memory and a processor, where the processor is coupled to the memory. The memory is configured to store images and data. The processor is configured to execute steps of: receiving an image sequence associated with a monitored area, where a region of interest (ROI) and a non-ROI are defined in the monitored area, and there exists a detection boundary between the ROI and the non-ROI; determining whether a target object is within the ROI according to the image sequence; when determining that the target object is not within the ROI and detecting that at least one first moving object is in the monitored area, determining whether the at least one first moving object enters the ROI and thereby setting the at least one first moving object as the target object according to a proportion of the at least one first moving object within the ROI and whether there exist continuous movements of the at least one first moving object in the ROI; and when determining that the target object is within the ROI, determining whether the target object leaves the ROI according to a proportion of at least one second moving object associated with the target object within the non-ROI and whether there exist continuous movements of the at least one second moving object in the non-ROI.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
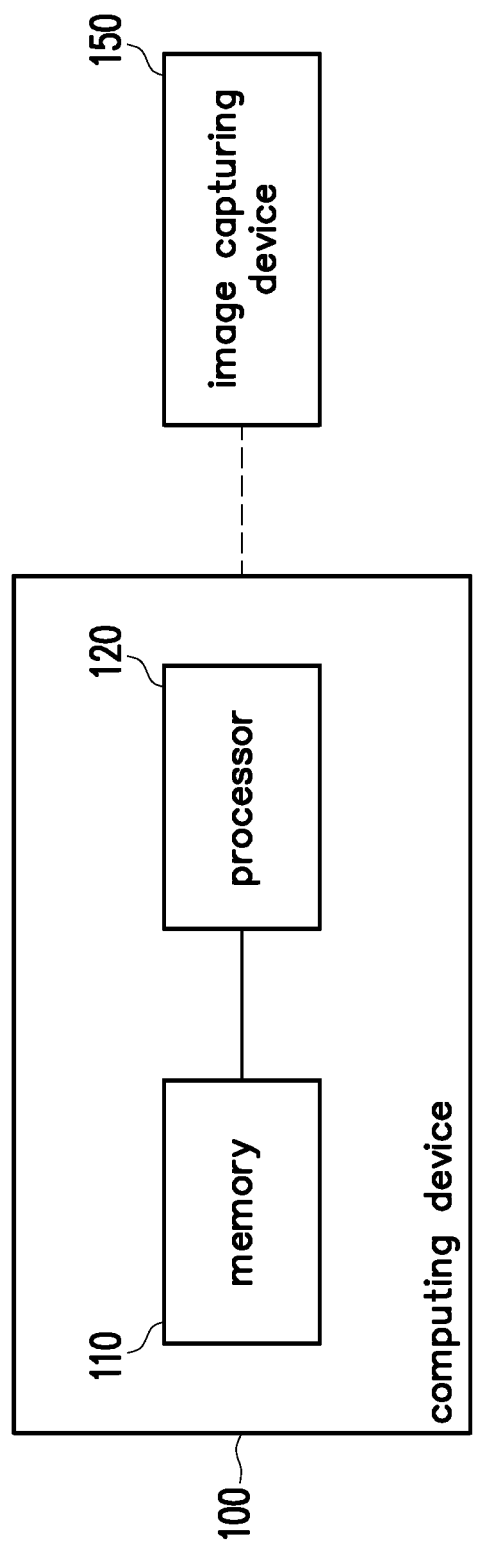
FIG. 1 is a block diagram illustrating a computing device according to an embodiment of the disclosure.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. The embodiments are merely a part of the disclosure rather than disclosing all possible embodiments of the disclosure. More specifically, these embodiments are simply examples of the method and the computing device recited in claims of the disclosure.

FIG. 1 is a block diagram illustrating a computing device according to an embodiment of the disclosure. It should, however, be noted that this is merely an illustrative example and the disclosure is not limited in this regard. All components of the computing device and their configurations are first introduced in FIG. 1. The functionalities of the components are disclosed in more detail in conjunction with FIG. 2.

A computing device 100 includes a memory 110 and a processor 120. The processor 120 is coupled to the memory 110. In an embodiment, the computing device 100 may be a personal computer, a notebook computer, a smart phone, a work station or other computer systems or platforms that can be wirelessly or wiredly connected to an image capturing device 150 through a communication interface. The image capturing device may be, for example, a digital camera, a digital camcorder, a webcam, a surveillance camera, and the communication interface may be a transmission interface supporting any wired or wireless communication standards for data transmissions with other devices. In another embodiment, the computing device 100 may be an embedded system built in, or in-built with, the image capturing device. The disclosure is not limited in this regard.

The memory 110 is configured to store data including images, programming codes or the like, and may be, for example, a stationary or mobile device in any form such as a random access memory (RAM), a read-only memory (ROM), a flash memory, a hard drive or other similar devices, or a combination of the above.

The processor 120 is configured to control operations among the components in the computing device 100 and may be, for example, a central processing unit (CPU), a graphic processing unit (GPU) or other programmable devices for general purpose or special purpose such as a microprocessor and a digital signal processor (DSP), a programmable controller, an application specific integrated circuit (ASIC), a programmable logic device (PLD), other similar devices, a combination of above-mentioned devices or integrated circuits.

Detailed steps of how the computing device 100 performs the method for monitoring the object would be given in the following embodiments along with each component in the computing device 100.

Figure 2:
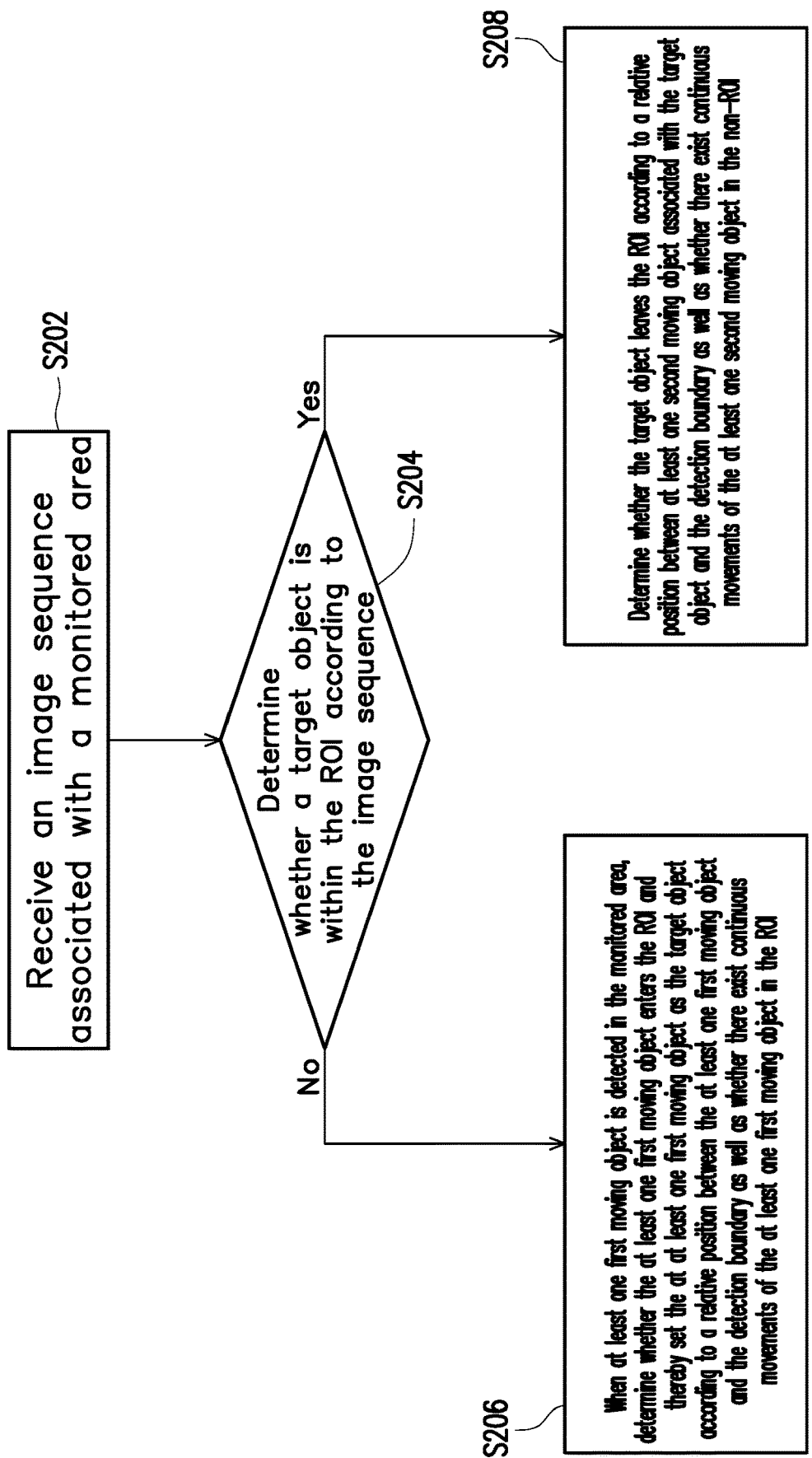
FIG. 2 is a flowchart illustrating a method for monitoring an object according to an embodiment of the disclosure.

FIG. 2 is a flowchart illustrating a method for monitoring an object according to an embodiment of the disclosure.

With reference to FIG. 1 in conjunction with FIG. 2, the processor 120 of the computing device 100 would first receive an image sequence associated with a monitored area (step S202), where the monitored area includes a ROI and a non-ROI, and there exists a detection boundary between the ROI and the non-ROI. In detail, the image capturing device herein may be mounted above the monitored area to continuously capture continuous image frames of the monitored area, and the captured continuous image frames would form the aforementioned "image sequence". In the following description, it is assumed that an angle of view of the image capturing device is fixed, i.e., the monitored area in the image sequence is fixed. In addition, before proceeding with the process of FIG. 2, the computing device 100 may allow a user to define the ROI from the monitored area. For instance, the processor 120 may obtain one single image associated with the monitored area (referred to as an "initial image" hereinafter) in advance and display a user interface which allows the user to select the ROI from the monitored area in the initial image by ways of box selection or corner selection through an input device. After receiving a selection operation performed by the user, the processor 120 may define the ROI from the monitored area and define a region outside the ROI as the non-ROI.

Next, the processor 120 would determine whether a target object is within the ROI according to the image sequence (step S204). Herein, the processor 120 may determine whether a motion is detected in the ROI according to the image sequence. When the motion is detected, it is determined that the target object is within the ROI. When the motion is not detected, it is determined that the target object is not within the ROI. However, in other embodiments of the disclosure, the processor 120 may also determine whether the target object is within the ROI by performing image recognition according to the image sequence so as to determine whether a human face or any other human feature exists in the ROI. In other embodiments of the disclosure, the processor 120 may also determine whether the target object is within the ROI according to life signs (e.g., breathing) detected by a non-contact electromagnetic wave measuring detector such as radar, infrared ray or the like.

When the processor 120 determines that the target object is not within the ROI and detects that at least one first moving object is in the monitored area, it would further determines whether the at least one first moving object enters the ROI and thereby sets the at least one first moving object as the target object according to a relative position between the at least one first moving object and the detection boundary as well as whether there exist continuous movements of the at least one first moving object in the ROI (step S206). In detail, when the target object is determined to be not within the ROI, the processor 120 would detect whether there exists any moving object in the entire monitored area. When any moving object is detected (assumed to be singular herein), the processor 120 would define such moving object as the first moving object, and determine whether the first moving object enters the ROI according a position relationship between the first moving object and the detection boundary as well as whether there exist the continuous movements of the first moving object in the ROI. When the first moving object is determined to be entering the ROI, the processor 120 would set the first moving object as the target object. In another embodiment, the processor 120 may determine whether the first moving object enters the ROI according to a proportion of the first moving object within the ROI as well as whether there exist the continuous movements of the first moving object in the ROI, but not on the basis of the relative position between the first moving object and the detection boundary.

On the other hand, when the processor 120 determines that the target object is within the ROI, it would further determine whether the target object leaves the ROI according to a relative position between at least one second moving object associated with the target object and the detection boundary as well as whether there exist continuous movements of the second moving object in the non-ROI (step S208). In detail, when the target object is determined not to be within the ROI, the processor 120 would detect any moving object (assumed to be singular herein) associated with the target object and set such moving object as the second moving object, and determines whether the second moving object leaves the ROI (i.e., enters the non-ROI) according to a position relationship between the second moving object and the detection boundary and whether there exist the continuous movements of the second moving object in the non-ROI. In another embodiment, the processor 120 may determine whether the target object leaves the ROI according to a proportion of the at least one second moving object within the non-ROI and whether there exist the continuous movements of the at least one second moving object in the non-ROI, but not on the basis of the relative position of the second moving object and the detection boundary.

For better comprehension on the above process, details are described below with reference to FIG. 3 as a flowchart illustrating an application scenario of a method for monitoring an object according to an embodiment of the disclosure. The application scenario of this embodiment is nursing care, in which the image capturing device may be disposed above a bed in a home environment, a hospital or a care center for personal surveillance. In other words, in this embodiment, the monitored area is the bed and a surrounding thereof within a field of view of the image capturing device, and the target object is the user of the bed.

Figure 3:
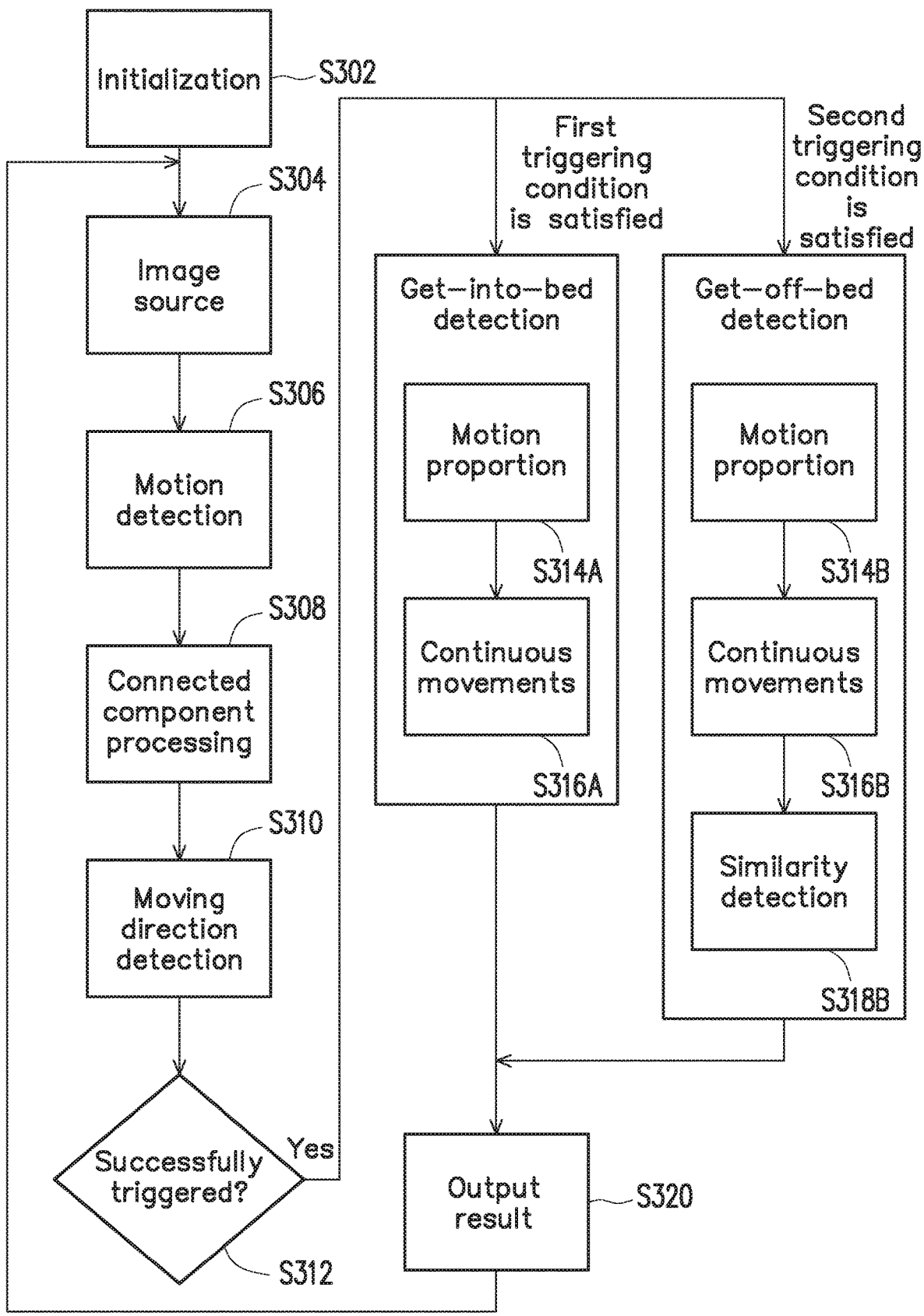
FIG. 3 is a flowchart illustrating an application scenario of a method for monitoring an object according to an embodiment of the disclosure.

With reference to FIG. 1 in conjunction with FIG. 3, the processor 120 of the computing device 100 would perform initialization (step S302), so as to obtain an initial image associated with the monitored area to be displayed on the user interface for the user to define a position of the bed in the initial image by ways of box selection or corner selection through the input device. Next, the processor 120 would set the ROI as inside the bed and the non-ROI as outside the bed such that a get-into-bed motion and a get-off-bed motion of the user may be detected in subsequent steps. Afterwards, the processor 120 would receive a real-time image sequence associated with the monitored area from the image capturing device as an image source (step S304) and then store the image sequence into the memory 110 for subsequent processing.

Next, the processor 120 would perform motion detection (step S306) on the image sequence to extract motions of each moving object from the image sequence. Herein, for each predetermined time interval, the processor 120 may calculate an image difference between a current input frame and a previous input frame in the image sequence to thereby output a motion image. The image difference corresponds to the motion of the moving object. It should be noted that, there exists at least one other input frame between the current input frame and the previous input frame in this embodiment so the amount of computation can be reduced.

Figure 4:
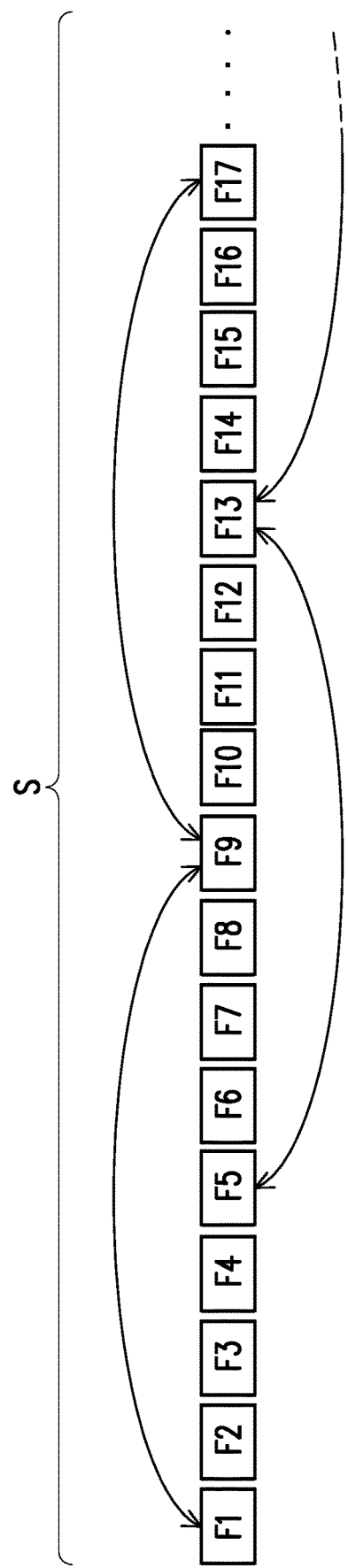
FIG. 4 is a schematic diagram illustrating an image sequence according to an embodiment of the disclosure.

Taking the schematic diagram of an image sequence S (formed by input frames F1, F2, . . . , F17, . . . ) according to an embodiment of the disclosure as illustrated in FIG. 4 as an example, the processor 120 may calculate the image difference by taking two input frames spaced by eight input frames as a time interval. Herein, the value of 8 is an empirical value, mainly due to the fact that the get-into-bed motion and the get-off-bed motion of the user would not be too large. If the two images taken are too close to each other, it is not easy to detect any motion since the difference between the two images is too small. In addition, the processor 120 would only perform image processing for every four input frames. Herein, the value of 4 is also an empirical value, mainly due to the fact that there is no urgency in determining the get-into-bed motion and the get-off-bed motion. Hence, there is no need for intensive detection and calculation to avoid excessive computation due to an inadequately short time interval or discontinuous images due to an overly long time interval. However, the number of frames would not be limited in the disclosure and may be adjusted and modified depending on actual calculation needs and efficiency.

For instance, if the current input frame is F9 at a current time point, the processor 120 would calculate an image difference according to the current input frame F9 and the previous input frame F1 and output one motion image according to the image difference. Next, four input frames later, the current input frame would be F13 at the current time point. In this case, the processor 120 would calculate an image difference according to the current input frame F13 and the previous input frame F5 and output another motion image according to the image difference. Next, four input frames later, the current input frame is F17 at the current time point. In this case, the processor 120 would calculate an image difference according to the current input frame F17 and the previous input frame F9 and output yet another motion image according to the image difference, and the rest of the process may be deduced in a similar fashion.

Figure 5:
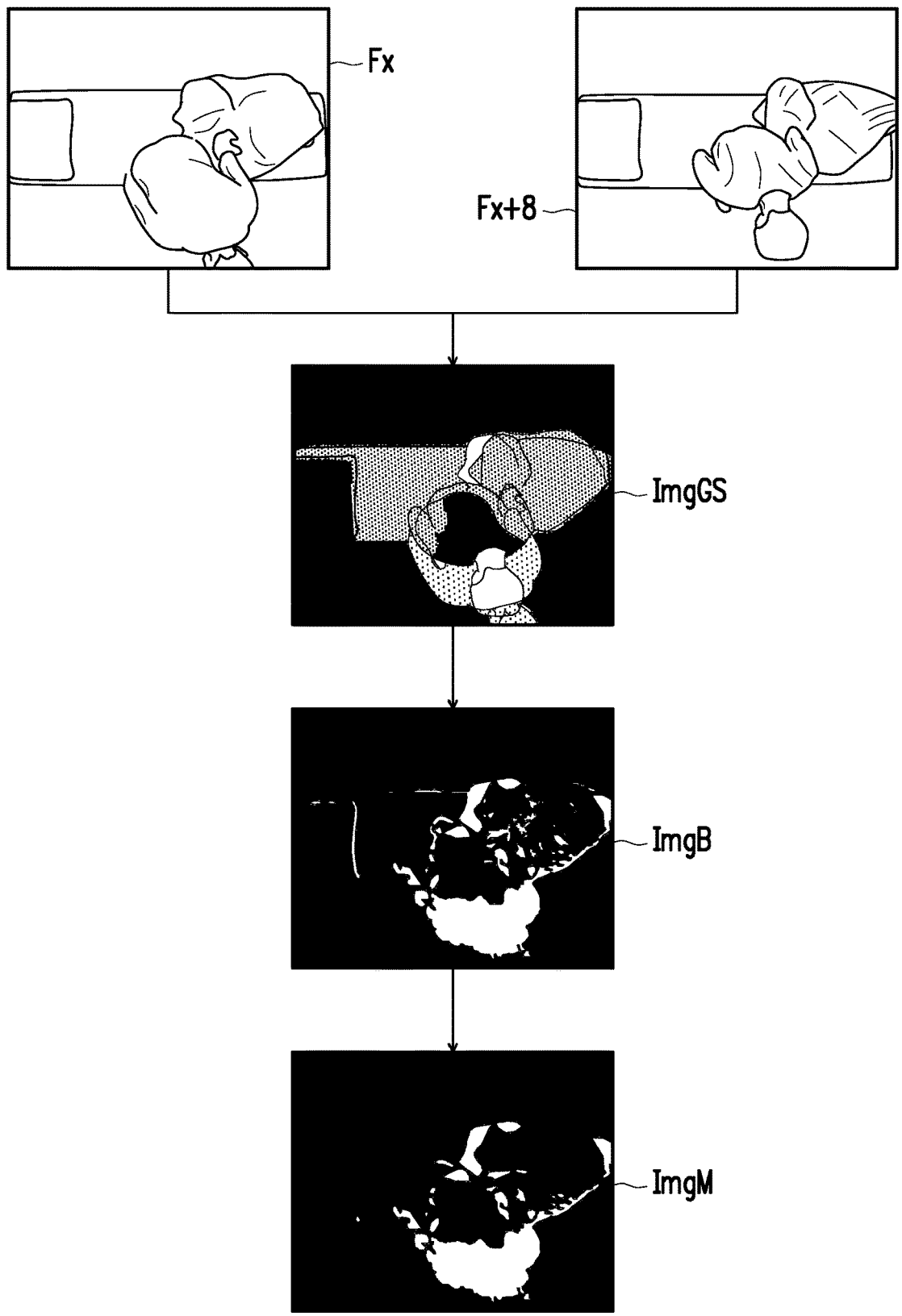
FIG. 5 is a functional flowchart illustrating steps of generating motion images according to an embodiment of the disclosure.

In this embodiment, the method for calculating the image difference and thereby generating the motion image by the processor 120 may be performed with reference to FIG. 5, which is a functional flowchart illustrating steps of generating motion images according to an embodiment of the disclosure. In FIG. 5, exemplary description is provided with the get-into-bed motion of the user as an example. The processor 120 may first perform image subtraction on a current input frame Fx+8 and a previous input frame Fx to generate a grayscale image ImgGS, in which pixels with larger image differences have higher values (i.e., closer to white). Next, the processor 120 would perform binarization on the grayscale image ImgGS to filter out pixels with overly small image differences and thereby generate a binary image ImgB. Afterwards, the processor 120 would perform erosion and dilation on the binarized image ImgB to delete overly fragmentary image difference and thereby generate a motion image ImgM.

Figure 6:
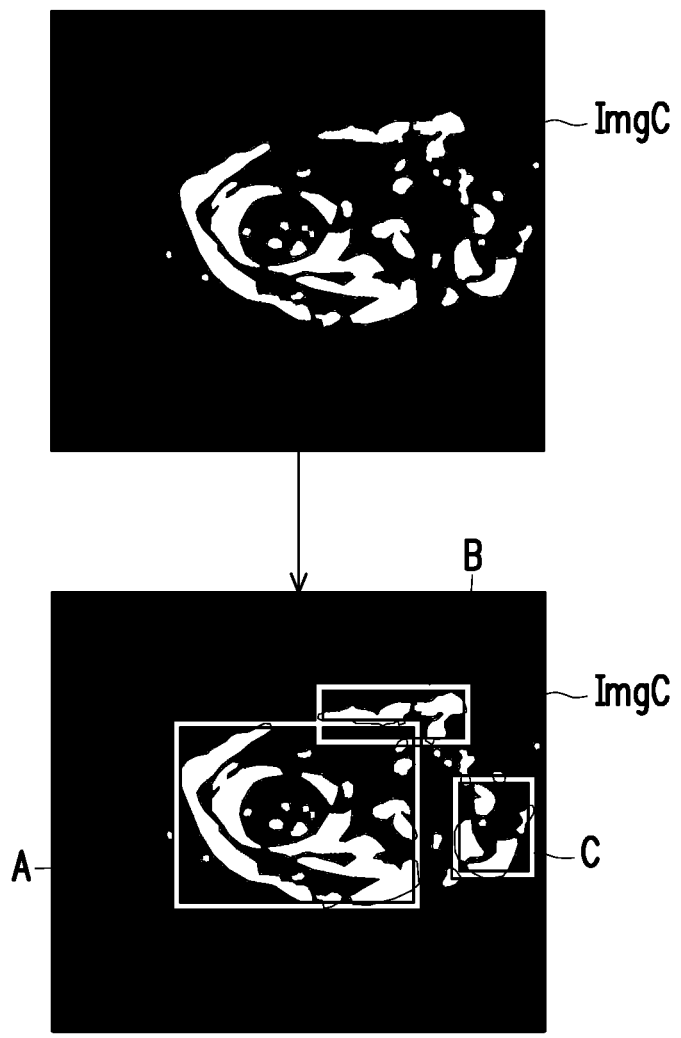
FIG. 6 is a schematic diagram illustrating motion images according to an embodiment of the disclosure.

Referring back to FIG. 3, after obtaining the motion image, the processor 120 would perform connected component processing (step S308) on each of the motion images to define one or more moving objects from each of the motion images. Taking the schematic diagram of a motion image ImgC as illustrated in FIG. 6 according to an embodiment of the disclosure as an example, motion information of the motion image ImgC is quite fragmentary. After performing connected component processing on the motion image ImngC, the processor 120 may define all motions of the motion image ImgC as three objects A, B and C, i.e., the motion image ImgC includes three moving objects.

Referring back to FIG. 3, in the following description, one or more moving objects would be described as a whole from a singular perspective, and yet the disclosure is not limited in this regard. When the motion of the moving object is detected in the motion image, the processor 120 would perform moving direction detection (step S310), which is a reference to trigger determination of the get-into-bed or get-off-bed motions. In detail, the processor 120 may first confirm a current status of the bed and perform two different processes based on whether the user is in bed or not. The processor 120 may conduct the confirmation by determining whether the motion of the moving object is in the bed. When the motion of the moving object is not in the bed, it indicates that the user is not in bed, and thus the processor 120 would perform get-into-bed moving detection. On the other hand, when the motion of the moving object is in the bed, it indicates that the user is in bed, and thus the processor 120 would perform get-off-bed moving detection.

In the case of the get-into-bed moving detection (i.e., the user is not in the bed), the detected moving object has not yet confirmed to be the user and is thus defined as a first moving object at this point. Next, the processor 120 would determine whether a relative position between the first moving object and a detection boundary satisfies a first triggering condition. In this embodiment, the detection boundary is at a fixed position. The processor 120 would define the detection boundary as a position that the user gets into or gets off bed, such as a boundary between the inside and the outside of the bed (e.g., a lower edge of the bed). In addition, the processor 120 would further define a first moving boundary associated with the first moving object. An initial position of the first moving boundary is outside the bed and between the detected first moving object and is defined for simulating the motion of the first moving object. When there exist multiple moving objects, the first moving boundary may be an edge farthest to the detection boundary among edges of one of the moving objects closest to the detection boundary (referred to as "a first reference moving object"). While the first moving object is moving, the processor 120 would continuously detect the position of the first moving boundary. Once the processor 120 detects that the first moving boundary moves from outside the bed into the bed in two adjacent motion images, the processor 120 would determine that the motion of the user is "ready to get into bed", i.e., the first triggering condition is satisfied.

Figure 7A:
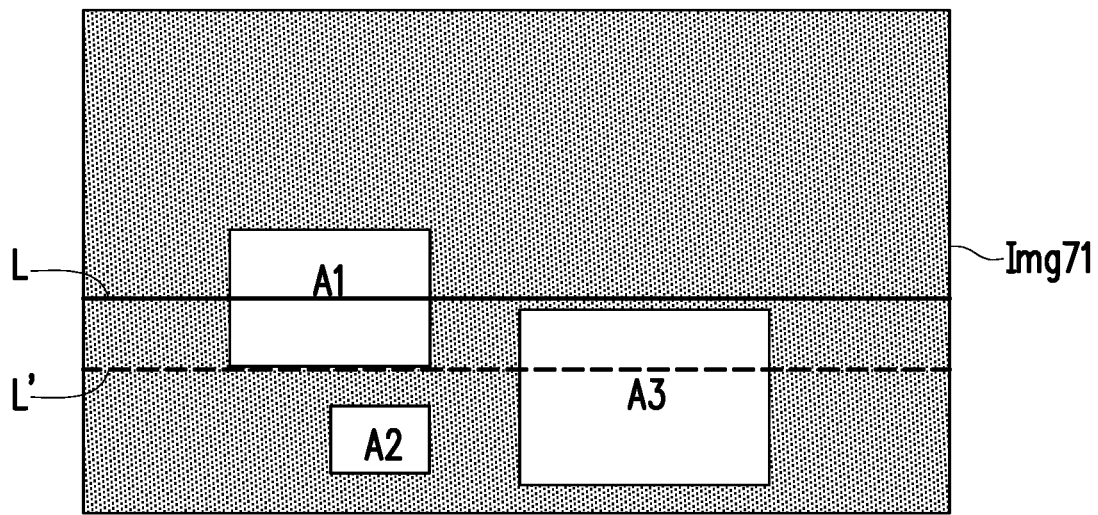
FIG. 7A is a schematic diagram illustrating motion images according to an embodiment of the disclosure.
Figure 7A:
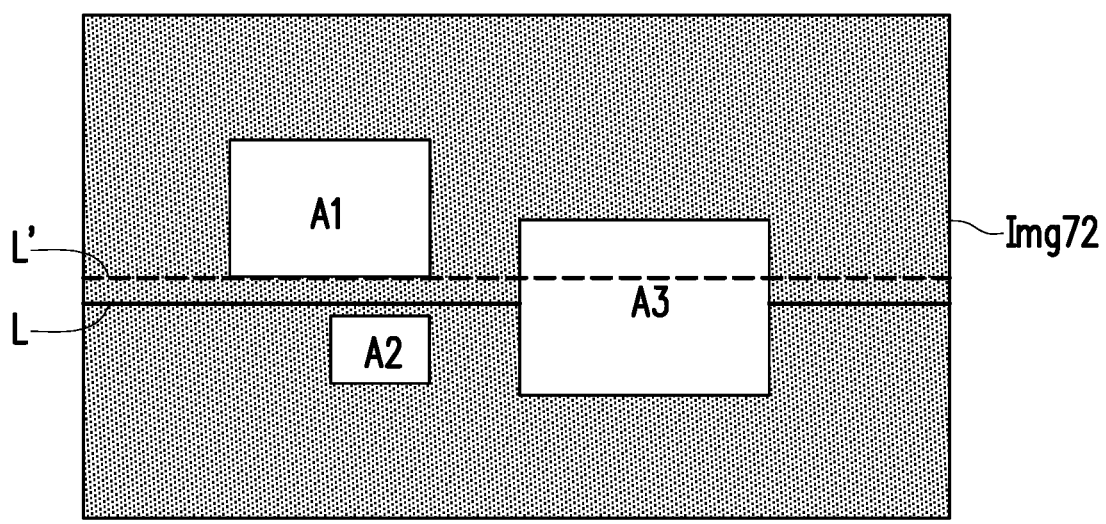

Specifically, taking the schematic diagram of the motion image as illustrated in FIG. 7A according to an embodiment of the disclosure as an example, it is assumed that the bed is above a detection boundary L. When detecting whether the user gets into bed, the processor 120 would first obtain an uppermost moving object A1 among moving objects A1, A2 and A3 (i.e. the moving object closest to the detection boundary L) in a motion image Img71 and consider an extension line of a lower edge of the moving object A1 as a moving boundary L'. If the processor 120 detects that the moving boundary L' has moved into the bed (i.e., above the detection boundary L) in the next motion image Img72, the processor 120 would determnnine that the motion of the user is "ready to get into bed".

As described above, the moving boundary L is defined for simulating the motion of the user. When the user intends to get into bed, multiple moving objects would be generated, and a part of which would first move from outside the bed into the bed (e.g., the moving object A1 of FIG. 7A). The reason that the lower edge of the moving object A1 is selected as the moving boundary L' is to confirm that the moving object A1 has already entered the bed. Therefore, so long as a part of the user completely enters the bed, it is determined that the motion of user is "ready to get into bed".

On the other hand, in the case of the get-off-bed moving direction detection (i.e., the user is in bed), the processor 120 would directly consider the moving object detected in the bed as the user, which are defined herein as a second moving object. Next, the processor 120 would determine whether the relative position between the second moving object and the detection boundary satisfies a second triggering condition. In this embodiment, the processor 120 would also define the detection boundary as the position that the user gets into or gets off the bed, such as the boundary between the inside and outside of the bed (e.g., the lower edge of the bed). In addition, the processor 120 would further define a second moving boundary associated with the second moving object, and an initial position of the second moving boundary is inside the bed and between the detected second moving object. When there exist multiple moving objects, the second moving boundary may be an edge farthest to the detection boundary among edges of one of the moving objects closest to the detection boundary (referred to as "a second reference moving object"). The processor 120 would detect a position of the second moving boundary. Once the processor 120 detects that the second moving boundary moves from inside the bed to outside the bed in two adjacent motion images, the processor 120 would determine that the motion of the user is "ready to get off bed", i.e., the second triggering condition is satisfied.

Figure 7B:
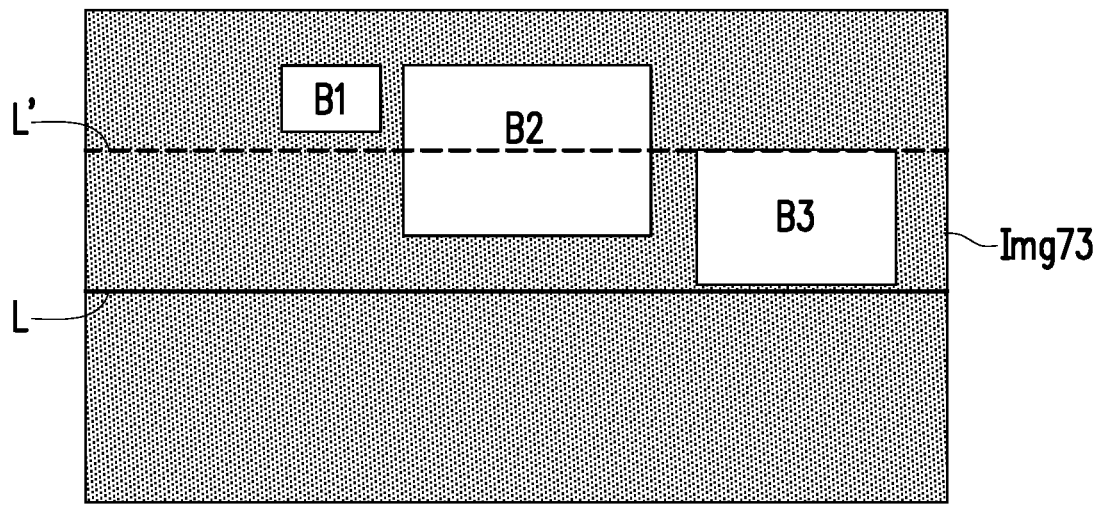
FIG. 7B is a schematic diagram illustrating motion images according to an embodiment of the disclosure.
Figure 7B:
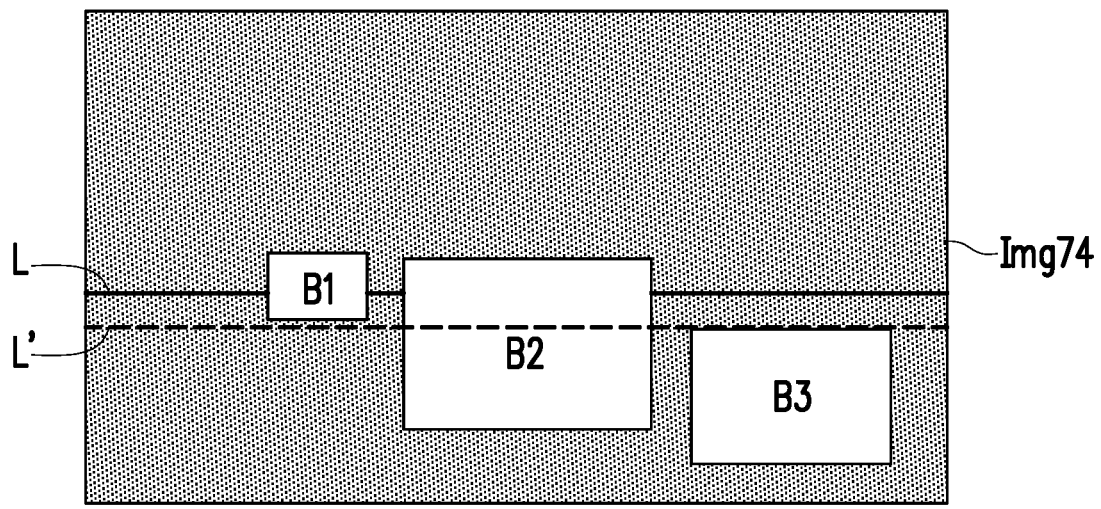

Specifically, taking the schematic diagram of the motion image as illustrated in FIG. 7B according to an embodiment of the disclosure as an example, it is assumed that the bed is above the detection boundary L. When detecting whether the user gets off bed, the processor 120 would first obtain a lowermost moving object B3 among moving objects B1, B2 and B3 (i.e. the moving object closest to the detection boundary L) in a motion image Img73 and consider an extension line of an upper edge of the moving object B3 as the moving boundary L'. If the processor 120 detects that the moving boundary L' has moved out from the bed (i.e., below the detection boundary L) in the next motion image Img74, the processor 120 would determine that the motion of the user is "ready to get off bed". Herein, the reason that the upper edge of the moving object B3 is selected as the moving boundary L' is to confirm that the moving object B3 has left the bed. Therefore, so long as a part of the user completely leaves the bed, it is determined that the motion of user is "ready to get off bed".

It should be noted that, FIG. 7B is applicable to get-off-bed detection in a normal scenario. However, all the motions would be defined as one single object if the user rolls off bed due to the fact that it occurs too instantaneously. Also, there may only exist the moving object corresponding to the motion image taken at the moment when the user rolls off bed, and the moving object may not necessarily exist in the next motion image. Therefore, in this special case scenario, when the processor 120 determines that the number of the second moving object in a motion image is exactly 1 and its size is greater than a predetermined size (e.g., a width of the second moving object is greater than one half of a width of the bed), the processor 120 would then determine whether the motion of the user is "roll off bed".

Figure 7C:
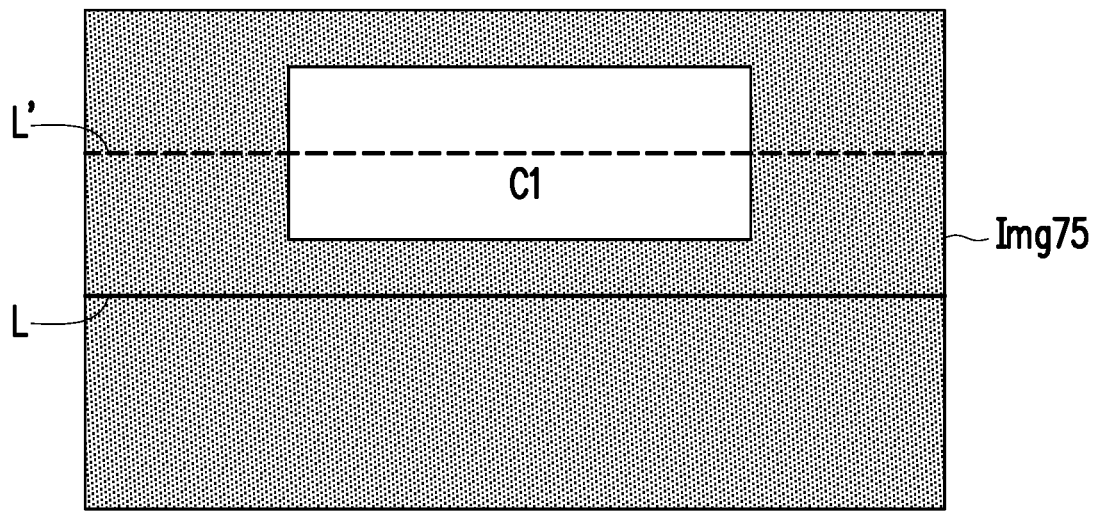
FIG. 7C is a schematic diagram illustrating motion images according to an embodiment of the disclosure.
Figure 7C:
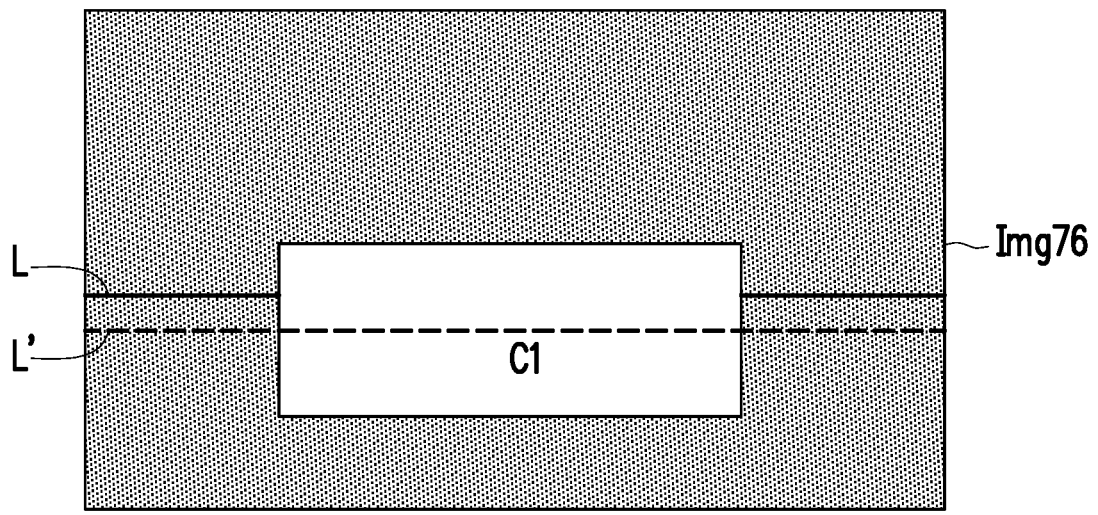

Taking the schematic diagram of the motion image illustrated according to an embodiment of the disclosure in FIG. 7C as an example, it is assumed that the bed is above the detection boundary L. When detecting whether the user rolls off bed, the processor 120 would first detect one single moving object C1 from a motion image Img75 and consider an extension line of a midline of the moving object C1 as the moving boundary L'. If the processor 120 detects that the moving boundary L' has moved out from the bed (i.e., below the detection boundary L) in the next motion image Img76, the processor 120 would determine that the motion of the user is "roll off bed".

Referring back to FIG. 3, when determining that the first triggering condition is satisfied, the processor 120 would start performing bed entering detection. The processor 120 would perform detection on motion proportion (step S314A) and continuous movements (step S316A) to determine whether the first moving object indeed enters into the bed and thereby confirm that the first moving object is the user so as to output a result (step S320). In detail, the processor 120 may determine whether a proportion of the first moving object inside the bed is greater than a proportion of the first moving object outside the bed as well as whether there exist the continuous movements of the first moving object inside the bed, and may determine that the first moving objects indeed enters the bed and is the user when both of the above conditions are satisfied.

Figure 8:
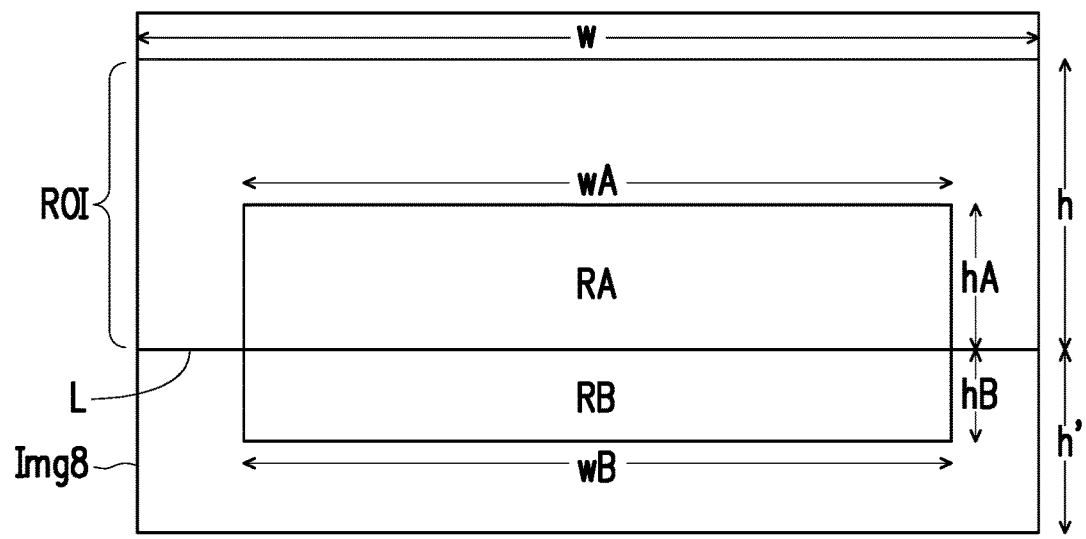
FIG. 8 is a schematic diagram illustrating motion images according to an embodiment of the disclosure.

In this embodiment, for speeding up the computation, the processor 120 may first define one region (referred to as "a first region") at the detection boundary, where the first region would cross over two regions inside and outside the bed. Taking the schematic diagram of a motion image Img8 as illustrated in FIG. 8 according to an embodiment of the disclosure as an example, it is assumed that a region ROI is the bed. The processor 120 would define a get-into-bed interval including a region RA and a region RB at the detection boundary L of the region ROI, where the region RA is inside the bed and the region RB is outside the bed. Here, an area of the bed ROI is w*h, and an area relationship between the regions RA and RB may be: wA=wB=0.7 w; hA=0.5 h; hB=0.5 h'. However, the disclosure is not limited in this regard. Herein, the purpose of defining the region RA and the region RB is to reasonably assume that the user gets into bed from the detection boundary L of the bed so the get-into-bed motion should be focused on the middle of the bed ROI. Next, the processor 120 would determine whether an area of a part of the first moving object within the region RA is greater than an area of another part of the first moving object within the region RB. More strictly, the processor 120 may assume that an area of a part of the first moving object within the region RA must be more than two times of an area of another part of the first moving objects within the region RB. In other words, the motion may be determined as the get-into-bed motion only when most of the motion is inside the bed. Next, the processor 120 would determine whether multiple continuous motion images (e.g., 3 continuous motion images) all include the first moving object in the region RA. Because the get-into-bed motion is continuous, if a predetermined number (e.g., 3) of the continuous motion images all include the first moving object, it means that there exist motions within the region RA in a duration of all 17 input frames, and thus the processor 120 would output a result indicating that the user gets into bed.

Logically speaking, it is assumed that the processor 120 detects the moving object at the position for getting into bed, then more moving objects start to appear inside the bed, and lastly, the moving objects continuously exist at positions inside the bed. The detection above is equivalent to detect a situation where the user moves at the bedside and then moves even frequently inside the bed. In other words, a part of the user is inside the bed and then there exist the continuous movements of the user in the bed. That is also to say, the user does not pass by but stays a while at the bedside. Accordingly, in this case, the processor 120 would determine the status of the user as in the get-into-bed motion.

Referring back to FIG. 3, when determining that the second triggering condition is satisfied, the processor 120 would start performing a bed leaving detection. Unlike the bed entering detection, when determining that the second triggering condition is satisfied, the processor 120 would obtain the current input frame from the image sequence and thereby set the current input frame as a temporary image. Then, the processor 120 would perform detections on motion proportion (step S314B) and continuous movements (step S316B) with similarity detection (step S318B) as a supplementary step to determine whether the user corresponding to the second moving objects indeed leaves the bed so as to output a result (step S320).

Herein, step S314B and step S316B are respectively similar to step S314A and step S316A except for the locations being detected (i.e. inside or outside the bed). Herein, the processor 120 may determine whether a proportion of the second moving object outside the bed is greater than a proportion of the second moving object inside the bed and whether there exist continuous movements of the second moving object outside the bed, and determine that the second moving object indeed leaves the bed and is the user when both of the above conditions are satisfied. In this embodiment, for speeding up the computation, the processor 120 may further adopt a method similar to that of FIG. 8 to improve efficiency for executing step S314B and step S316B. Persons with ordinary skill in the art should be able to derive execution details of step S314B and step S316B from FIG. 8, so the related description would not be repeated hereinafter.

When determining that the motion proportion and the continuous movements both satisfy a possibility of the get-off-bed motion, the processor 120 would obtain the current input frame from the image sequence again and thereby set the current input frame as a current image. Next, the processor 120 would perform similarity comparison on the current image and the temporary image when the second triggering condition is satisfied. When the similarity between the two is low, the processor 120 would determine that the user has the get-off-bed motion. Otherwise, when the similarity between the two is high, the processor 120 would determine that the user does not have any get-off-bed motion. The reason for doing so is that the temporary image is an image of the user ready to get off bed, while the current image is an image of the user getting off the bed or already got off bed. If the similarity between the two is low, it means that the user has the get-off-bed motion. If the similarity between the two is high, it means that the user has been laying on the bed the whole time, and an outsider (e.g., caregiver, medical personnel or family member) may have entered by accident so the processor 120 would mistakenly determine that the status is ready to get off bed in accordance with the second triggering condition being satisfied. Therefore, if the similarity is used in the determination, the problem above may then be solved.

Figure 9:
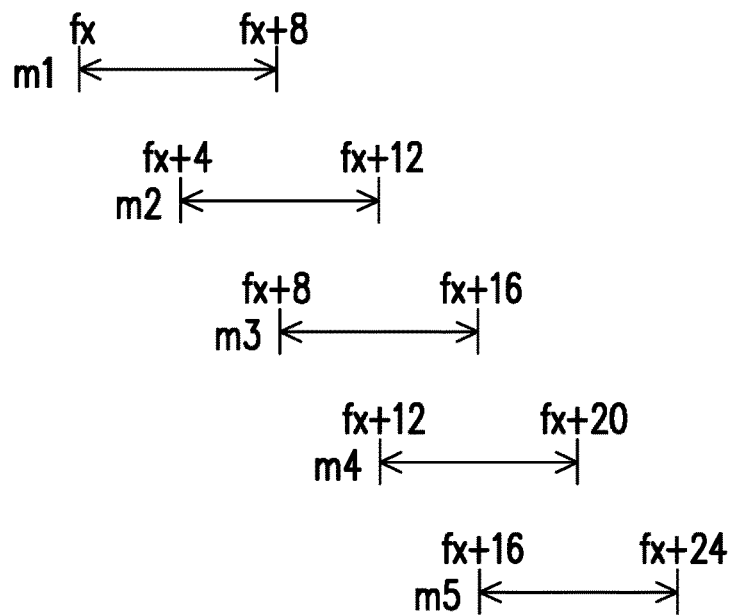
FIG. 9 is a schematic diagram illustrating time axes according to an embodiment of the disclosure.

For better comprehension, a method for conducting the bed leaving detection may be described using FIG. 9, which is a schematic diagram illustrating time axes according to an embodiment of the disclosure. In this embodiment, it is assumed that fx is a first input frame, and an input frame arranged eight frames after the first input frame is fx+8. The first motion image m1 may be generated by calculating the input frame fx and the input frame fx+8. The rest of four motion images m2 to m5 may be generated in a similar fashion. It is assumed that the processor 120 determines the second triggering condition (ready to get off bed) as satisfied in the motion image m1 and sets the input frame fx as the temporary image. The processor 120 may detect whether the motion at the bedside in the motion image m1 is outside the bed and whether there are more motions outside the bed. If the determination is affirmative, the processor 120 would further determine whether there exist continuous movements outside the bed in the motion images m2 to m4. If the determination is affirmative, the processor 120 would further obtain a current image fx+20 corresponding to the motion image m4 so similarity comparison may be performed with the temporary image fx. If the similarity between the current image fx+20 and the temporary image fx is low, the processor 120 would output a result indicating that the user gets off bed.

In this embodiment, because the application scenario is nursing care and the purpose is to achieve for personal surveillance, the processor 120 may output a first prompt signal when confirming that the user gets into bed and may output a second prompt signal when confirming the user gets off bed or rolls off bed. The first prompt signal and the second prompt signal may prompt a nursing personnel or a caregiver by ways of making sound, light, text, vibration or the like through an output device. In addition, the processor 120 may also notify nursing personnel or caregiver by transmitting the first prompt signal and the second prompt signal in form of messages to other electronic devices (e.g., cell phone, smart watch, smart bracelet or the like). In this way, medical personnel or caregiver can remotely monitor the patient, so as to save human resources in nursing or caring. Similarly, in other application scenarios, when determining that the target object enters or leaves the ROI, the processor 120 may also output the first prompt signal or the second prompt signal for surveillance purposes.

In summary, the method for monitoring the object and the computing device thereof proposed by the disclosure can effectively monitor whether a target object enters or leaves a ROI by image detection to thereby reduce the cost of manual monitoring. The target object mentioned in the disclosure is not limited only to be the human being described in the foregoing embodiments, but may also include animals or any moving objects. Also, the ROI mentioned in the disclosure is not limited only to be the bed in the foregoing embodiments, but may also include objects or regions with definable boundaries.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for monitoring an object, applicable to a computing device comprising a processor and comprising:
   receiving an image sequence associated with a monitored area by the processor, wherein a region of interest (ROI) and a non-ROI are defined in the monitored area, and wherein there exists a detection boundary between the ROI and the non-ROI;
   determining whether a target object is either within the ROI or not within the ROI by the processor according to the image sequence;
   in response to determination that the target object is not within the ROI and detection that at least one first moving object is in the monitored area, determining whether the at least one first moving object enters the ROI by the processor according to a relative position between the at least one first moving object and the detection boundary as well as whether there exist continuous movements of the at least one first moving object in the ROI and thereby setting the at least one first moving object as the target object; and
   in response to determination that the target object is within the ROI, determining whether the target object leaves the ROI by the processor according to a relative position between at least one second moving object and the detection boundary as well as whether there exist continuous movements of the at least one second moving object in the non-ROI, wherein the at least one second moving object is a portion or an entire portion of the target object.

2. The method according to claim 1, wherein before the step of receiving the image sequence associated with the monitored area, the method further comprises:
   displaying an initial image of the monitored area on a user interface; and
   receiving a selection operation performed by a user through the user interface to define the ROI from the monitored area.

3. The method according to claim 1, wherein the image sequence is formed by a plurality of input frames, and after the step of receiving the image sequence associated with the monitored area, the method further comprises:
   for each predetermined time interval, calculating an image difference between a current input frame and a previous input frame in the image sequence to generate a motion image, wherein there exists at least one other input frame between the current input frame and the previous input frame, and wherein the motion image corresponds to a motion of at least one moving object.

4. The method according to claim 3, wherein for each of a plurality of predetermined time intervals, the step of calculating the image difference between the current input frame and the previous input frame in the image sequence to generate the motion image comprises:
subtracting the previous input frame from the current input frame to generate a grayscale image;
performing binarization on the grayscale image to generate a binarized image; and
performing erosion and dilation on the binarized image to generate the motion image.

5. The method according to claim 3, wherein after the step of generating the motion image, the method further comprises:
performing connected component processing on each of the motion images to define the at least one moving object therefrom.

6. The method according to claim 3, wherein the step of determining whether the target object is either within the ROI or not within the ROI according to the image sequence comprises:
in response to detection that the motion of the at least one moving object is in the motion images, determining whether the motion of the at least one moving object is within the ROI;
in response to determination that the motion of the at least one moving object is within the ROI, determining that the target object is within the ROI; and
in response to determination that the motion of the at least one moving object is not within the ROI, determining that the target object is not within the ROI.

7. The method according to claim 3, wherein in response to determination that the target object is not within the ROI and detection that the at least one first moving object is in the monitored area, the step of determining whether the at least one first moving object enters the ROI according to the relative position between the at least one first moving object and the detection boundary as well as whether there exist the continuous movements of the at least one first moving object in the ROI and thereby setting the at least one first moving object as the target object comprises:
determining whether the relative position between the at least one first moving object and the detection boundary satisfies a first triggering condition; and
in response to determination that the first triggering condition is satisfied, determining whether the at least one first moving object enters the ROI according to whether there exist the continuous movements of the at least one first moving object in the ROI and thereby setting the at least one first moving object as the target object.

8. The method according to claim 7, wherein the step of determining whether the relative position between the at least one first moving object and the detection boundary satisfies the first triggering condition comprises:
defining a first moving boundary associated with the at least one first moving object, wherein an initial position of the first moving boundary is outside the ROI and between the at least one first moving object;
detecting a position of the first moving boundary; and
in response to detection that the first moving boundary moves into the ROI, determining that the first triggering condition is satisfied.

9. The method according to claim 8, wherein the first moving boundary is a first edge of a first reference moving object closest to the detection boundary among the at least one first moving object, and wherein the first edge is a boundary farthest to the detection boundary among edges of the first reference moving object.

10. The method according to claim 7, wherein the step of determining whether the at least one first moving object enters the ROI according to whether there exist the continuous movements of the at least one first moving object in the ROI and thereby setting the at least one first moving object as the target object comprises:
determining whether a proportion of the at least one first moving object within the ROI is greater than that within the non-ROI and determining whether there exist the continuous movements of the at least one first moving object in the ROI; and
in response to determination that the proportion of the at least one first moving object within the ROI is greater than that within the non-ROI and determination that there exist the continuous movements of the at least one first moving object in the ROI, determining that the at least one first moving object enters the ROI and thereby setting the at least one first moving object as the target object.

11. The method according to claim 10, wherein the step of calculating the proportion of the at least one first moving object within the ROI and the proportion of the at least one first moving object within the non-ROI comprises:
defining a first region at the detection boundary, wherein the first region comprises a first ROI in the ROI and a first non-ROI in the non-ROI; and
calculating and setting proportions of the at least one first moving object within the first ROI and within the first non-ROI respectively as the proportions of the at least one first moving object within the ROI and the non-ROI.

12. The method according to claim 3, wherein in response to determination that the target object is within the ROI, the step of determining whether the target object leaves the ROI according to the relative position between the at least one second moving object associated with the target object and the detection boundary as well as whether there exist the continuous movements of the at least one second moving object in the non-ROI comprises:
determining whether the relative position between the at least one second moving object and the detection boundary satisfies a second triggering condition; and
in response to determination that the second triggering condition is satisfied, determining whether the target object leaves the ROI according to a proportion of the at least one second moving object within the non-ROI and whether there exist the continuous movements of the at least one second moving object in the non-ROI.

13. The method according to claim 12, wherein the step of determining whether the relative position between the at least one second moving object and the detection boundary satisfies the second triggering condition comprises:
defining a second moving boundary associated with the at least one second object, wherein an initial position of the second moving boundary is inside the ROI and between the at least one second moving object;
detecting a position of the second moving boundary; and
in response to detection that the second moving boundary leaves the ROI, determining that the second triggering condition is satisfied.

14. The method according to claim 13, wherein the second moving boundary is a second edge of a second reference moving object closest to the detection boundary among the at least one second moving object, and wherein the second edge is a boundary farthest to the detection boundary among edges of the second reference moving object.

15. The method according to claim 12, wherein the number of the at least one second moving object is 1, wherein a size of the at least one second moving object is greater than a predetermined size, and wherein the step of determining whether the relative position between the at least one second moving object and the detection boundary satisfies the second triggering condition comprises:
    defining a second moving boundary associated with the at least one second object, wherein the second moving boundary is a midline of the at least one second moving object;
    detecting a position of the second moving boundary; and
    in response to detection that the second moving boundary leaves the ROI, determining that the target object leaves the ROI.

16. The method according to claim 12, wherein when the second triggering condition is satisfied, the method further comprises:
    obtaining a current input frame from the image sequence and setting the current frame as a temporary image.

17. The method according to claim 16, wherein the step of determining whether the target object leaves the ROI according to the proportion of the at least one second moving object within the non-ROI and whether there exist the continuous movements of the at least one second moving object in the non-ROI comprises:
    determining whether the proportion of the at least one second moving object within the non-ROI is greater than that within the ROI and determining whether there exist the continuous movements of the at least one second moving object in the non-ROI;
    in response to determination that the proportion of the at least one second moving object within the non-ROI is greater than that within the ROI and determining that there exist the continuous movements of the at least one second moving object in the non-ROI, obtaining another current input frame from the image sequence and setting the another current input frame as a current image;
    determining a similarity between the current image and the temporary image; and
    in response to determination that the similarity between the current image and the temporary image is low, determining that the target object leaves the ROI.

18. The method according to claim 16, wherein the step of calculating the proportion of the at least one second moving object within the ROI and the proportion of the at least one second moving object within the non-ROI comprises:
    defining a second region at the detection boundary, wherein the second region comprises a second ROI in the ROI and a second non-ROI in the non-ROI; and
    calculating and setting proportions of the at least one second moving object within the second ROI and within the second non-ROI respectively as the proportions of the at least one second moving object within the ROI and the non-ROI.

19. The method according to claim 1 further comprising:
    in response to determination that the at least one first moving object enters the ROI and thereby setting the at least one first moving object as the target object, generating and outputting a first prompt signal; and
    in response to determination that the target object leaves the ROI, generating and outputting a second prompt signal.

20. The method according to claim 1, wherein the monitored area is a bed and a surrounding thereof, wherein the ROI is inside the bed and the non-ROI is outside the bed, wherein entering the ROI corresponds to a get-into-bed motion, and wherein leaving the ROI corresponds to a get-off-bed motion.

21. A computing device, comprising:
    a memory, configured to store images and data;
    a processor, coupled to the memory and configured to:
        receive an image sequence associated with a monitored area, wherein a region of interest (ROI) and a non-ROI are defined in the monitored area, and wherein there exists a detection boundary between the ROI and the non-ROI;
        determine whether a target object is either within the ROI or not within the ROI according to the image sequence;
        in response to determination that the target object is not within the ROI and detection that at least one first moving object is in the monitored area, determine whether the at least one first moving object enters the ROI according to a relative position between the at least one first moving object and the detection boundary as well as whether there exist continuous movements of the at least one first moving object in the ROI and thereby set the at least one first moving object as the target object; and
        in response to determination that that the target object is within the ROI, determine whether the target object leaves the ROI according to a relative position between at least one second moving object and the detection boundary as well as whether there exist continuous movements of the at least one second moving object in the non-ROI, wherein the at least one second moving object is a portion or an entire portion of the target object.

22. A method for monitoring an object, applicable to a computing device comprising a processor, and comprising:
    receiving an image sequence associated with a monitored area by the processor, wherein a region of interest (ROI) and a non-ROI are defined in the monitored area, and wherein there exists a detection boundary between the ROI and the non-ROI;
    determining whether a target object is either within the ROI or not within the ROI by the processor according to the image sequence;
    in response to determination the target object is not within the ROI and detection that at least one first moving object is in the monitored area, determining whether the at least one first moving object enters the ROI according to a proportion of the at least one first moving object within the ROI and whether there exist continuous movements of the at least one first moving object in the ROI and thereby setting the at least one first moving object as the target object by the processor; and
    in response to determination that the target object is within the ROI by the processor, determining whether the target object leaves the ROI by the processor according to a proportion of at least one second moving object within the non-ROI and whether there exist continuous movements of the at least one second moving object in the non-ROI, wherein the at least one second moving object is a portion or an entire portion of the target object.

23. The method according to claim 22, wherein the image sequence is formed by a plurality of input frames, and after the step of receiving the image sequence associated with the monitored area, the method further comprises:

for each predetermined time interval, calculating an image difference between a current input frame and a previous input frame in the image sequence to generate a motion image, wherein there exists at least one other input frame between the current input frame and the previous input frame, and wherein the motion image corresponds to a motion of at least one moving object.

24. The method according to claim 23, wherein the step of determining whether the at least one first moving object enters the ROI according to the proportion of the at least one first moving object within the ROI and whether there exist the continuous movements of the at least one first moving object in the ROI and thereby setting the at least one first moving object as the target object comprises:

determining whether the proportion of the at least one first moving object within the ROI is greater than that within the non-ROI and determining whether there exist the continuous movements of the at least one first moving object in the ROI; and in response to determination that the proportion of the at least one first moving object within the ROI is greater than that within the non-ROI and determination that there exist the continuous movements of the at least one first moving object in the ROI, determining that the at least one first moving object enters the ROI and thereby setting the at least one first moving object as the target object.

25. The method according to claim 24, wherein the step for calculating the proportion of the at least one first moving object within the ROI and the proportion of the at least one first moving object within the non-ROI comprises:

defining a first region at the detection boundary, wherein the first region comprises a first ROI in the ROI and a first non-ROI in the non-ROI; and calculating and setting proportions of the at least one first moving object within the first ROI and within the first non-ROI respectively as the proportions of the at least one first moving object within the ROI and the non-ROI.

26. The method according to claim 23, wherein the step of determining whether the target object leaves the ROI according to the proportion of the at least one second moving object associated with the target object within the non-ROI and whether there exist the continuous movements of the at least one second moving object in the non-ROI comprises:

determining whether the proportion of the at least one second moving object within the non-ROI is greater than that within the ROI and determining whether there exist the continuous movements of the at least one second moving object in the non-ROI; and in response to determination that the proportion of the at least one second moving object within the non-ROI is greater than that within the ROI and determination that there exist the continuous movements of the at least one second moving object in the non-ROI, determining that the target object leaves the ROI.

27. The method according to claim 26, wherein the step for calculating the proportion of the at least one second moving object within the ROI and the proportion of the at least one second moving object within the non-ROI comprises:

defining a second region at the detection boundary, wherein the second region comprises a second ROI in the ROI and a second non-ROI in the non-ROI; and calculating and setting proportions of the at least one second moving object within the second ROI and within the second non-ROI respectively as the proportions of the at least one second moving object within the ROI and the non-ROI.

28. The method according to claim 22 further comprising:

in response to determination that the at least one first moving object enters the ROI and thereby setting the at least one first moving object as the target object, generating and outputting a first prompt signal; and in response to determination that the target object leaves the ROI, generating and outputting a second prompt signal.

29. The method according to claim 22, wherein the monitored area is a bed and a surrounding thereof, wherein the ROI is inside the bed and the non-ROI is outside the bed, wherein entering the ROI corresponds to a get-into-bed motion, and wherein leaving the ROI corresponds to a get-off-bed motion.

30. A computing device, comprising:

a memory, configured to store images and data;

a processor, coupled to the memory and configured to:

receive an image sequence associated with a monitored area, wherein the monitored area comprises a region of interest (ROI) and a non-ROI, and wherein there exists a detection boundary between the ROI and the non-ROI;

determine whether a target object is either within the ROI or not within the ROI according to the image sequence;

in response to determination that the target object is not within the ROI and detecting that at least one first moving object is in the monitored area, determine whether the at least one first moving object enters the ROI according to a proportion of the at least one first moving object within the ROI and whether there exist continuous movements of the at least one first moving object in the ROI and thereby setting the at least one first moving object as the target object; and in response to determination that the target object is within the ROI, determine whether the target object leaves the ROI according to a proportion of at least one second moving object within the non-ROI and whether there exist continuous movements of the at least one second moving object in the non-ROI, wherein the at least one second moving object is a portion or an entire portion of the target object.

* * * * *